(12) United States Patent
Konno et al.

(10) Patent No.: US 6,589,687 B1
(45) Date of Patent: *Jul. 8, 2003

(54) CLEAVED TYPE SAFETY VALVE FOR METAL VESSELS

(75) Inventors: Keiichi Konno, Miyagi (JP); Kazuho Suzuki, Miyagi (JP); Yutaka Konno, Miyagi (JP)

(73) Assignees: Sony Corporation, Tokyo (JP); Konno Kogyosho Co., Ltd., Miyagi (JP)

(*) Notice: Subject to any disclaimer, the term of this patent is extended or adjusted under 35 U.S.C. 154(b) by 98 days.

This patent is subject to a terminal disclaimer.

(21) Appl. No.: 09/725,522

(22) Filed: Nov. 29, 2000

Related U.S. Application Data

(63) Continuation of application No. 09/068,414, filed on Oct. 19, 1998, now abandoned.

(30) Foreign Application Priority Data

Nov. 13, 1995 (JP) .............................................. 7-294258

(51) Int. Cl.⁷ ................................................. H01M 2/04
(52) U.S. Cl. .................. 429/56; 137/68.27; 220/203.08
(58) Field of Search .............................. 429/53, 54, 56, 429/61, 72, 82; 137/68.19, 68.23, 68.28, 68.27; 220/203.08, 89.2; 228/1.1, 110, 112.1, 198

(56) References Cited

U.S. PATENT DOCUMENTS 5,411,158 A * 5/1995 Kays et al. ............... 137/68.27
6,006,938 A * 12/1999 Mozley et al. ........... 137/68.19
6,265,097 B1 * 7/2001 Konno et al. ............ 137/68.19

FOREIGN PATENT DOCUMENTS

EP         0881697 A1   12/1998
JP         10144277     5/1998

* cited by examiner

Primary Examiner—Stephen Kalafut
Assistant Examiner—M. Wills
(74) Attorney, Agent, or Firm—Sonnenschein, Nath & Rosenthal

(57) ABSTRACT

There has been developed a safety valve installed on a small-sized cell vessel which remains hermetically sealed during the normal operation but which instantly releases the pressure in the inside of the vessel if, due to abnormalities, such as overcharging, the pressure is increased and reaches a prescribed value to prevent explosion or deformation of the cell vessel to evade the risk to the human being or destruction of the equipment. The metal foil type safety valve by the cold pressure welding of the present invention cold-pressure-welds the metal foil for sealing the air vent hole in the metal vessel. If the internal pressure in the vessel reaches the prescribed value, the metal foil is cleft to form an opening in the vessel to release the internal pressure.

19 Claims, 3 Drawing Sheets

CLEAVED TYPE SAFETY VALVE FOR METAL VESSELS

RELATED APPLICATIONS

This application is a continuation of U.S. application Ser. No. 09/068,414, filed Oct. 19, 1998 now abandoned. The present and foregoing applications claim priority to Japanese application No. 7-294258 filed Nov. 13, 1995.

FIELD OF THE INVENTION

This invention relates to a cleavage type safety valve provided in a metal vessel of, for example, a secondary cell. More specifically, the present invention relates to cleavage type safety valve for opening the pressure generated in the vessel in an emergency, for preventing deformation or the like of the vessel or for preventing destruction of equipment.

BACKGROUND OF THE INVENTION

A high-performance secondary cell, such as lithium ion cell, which recently has come into widespread use, is characterized by a small size, lightness in weight and a large capacity. Lithium ion cells are used in increasing numbers in a portable equipment, such as a portable telephone set or a note-type computer.

However, this type of the high-performance secondary cell has a high energy density in the cell. While a combustible organic solvent is occasionally used as an electrolytic solution, such that, in case of an emergency, such as during shorting or overcharging in the cell, combustible gases tend to be evolved or ignited in the cell vessel and raise the internal pressure in the cell thus producing a problem such as inadvertent leakage of the cell contents.

If the internal pressure in the vessel exceeds the compressive strength, the vessel is deformed excessively. If the limit of compression is exceeded, the vessel explodes If such accident occurs during use of the portable equipment, the user is endangered or the equipment is destroyed.

For avoiding this risk, a cleavage type safety valve which, if the internal pressure in the vessel is increased beyond a prescribed value, part of the vessel is cleaved to form an opening to open the internal pressure.

The cleavage type safety valve, used up to now, is classified into a marking type safety valve and a metal foil type safety valve, as selected depending on usage and application.

The marking type safety valve is of such a structure in which a marker punch having a tooth end with a wedge-shaped cross-section is driven into a portion of a vessel for machining a cleavage groove to a circular or the like contour so that, if the internal pressure of the vessel is increased to higher than a prescribed value, the thin-walled portion of the bottom of the cleavage groove is cleft to open the internal pressure.

The marker type safety valve has merits in facilitated machining and low manufacturing cost.

However, in driving the marker punch, cracks generated at the tooth end of the marker punch are left in the thin-walled portion after machining, such that, if the thin-walled portion is of a reduced wall thickness, cracks are formed extending through the thin-walled portion, thus possibly producing leakage.

The cleavage pressure in the marker type safety valve is determined by the pressure-receiving surface surrounded by the cleavage groove and the plate thickness of the thin-walled portion of the bottom of the cleavage groove. Thus, if it is desired to reduce the pressure-receiving surface for installment in a small-sized vessel and nevertheless it is desired to prevent the cleavage pressure from increasing, the plate thickness of the thin-walled portion needs to be decreased further. However, if the plate thickness of the thin-walled portion is further reduced, the ratio of rejection due to leakage is increased. Thus, difficulties are met in reducing the size of the marker type safety valve.

The metal foil type safety valve is of such a structure in which a metal foil is attached for closing the air vent hole in the vessel for hermetic sealing, so that, if the internal pressure in the vessel exceeds a prescribed value in case of an emergency, the metal foil becomes cleft to open the internal pressure.

In the conventional metal foil type safety valve, the metal foil is attached by a welding method. Since the lower limit value of the plate thickness of the metal foil that can be attached by the welding method is not more than one-half the lower limit value of the plate thickness of the thin-walled portion of the bottom of the cleavage bottom in case of the marking type cleavage cell, the metal foil type safety valve can, in this respect, be reduced more easily in size.

However, in attachment of the metal foil by the welding method, there are encountered problems of through-holes proper to the welding processing and technical difficulties in attachment and hermetic sealing by the welding method. In addition, equipment investment becomes costly thus presenting cost and quality problems.

SUMMARY OF THE INVENTION

The present invention has developed a metal foil type safety valve by the cold pressure welding method (referred to hereinafter as the present safety valve) in which a metal foil is attached by a cold pressure welding method for stopping air vent holes in a vessel to provide a safety valve.

The cold pressure welding method is a machining method in which portions of two metal components to be welded together are pressed and welded together at ambient temperature in a cold pressure welding metal mold.

The welding principle resides in inducing plastic deformation in the weld by pressure applied by the clad pressure welding metal mold, generating a new surface in both contact surfaces by friction between two contact surfaces and continuous pressing and holding in this state for inducing interatomic linkage for welding the two components together.

Heretofore, in cold pressure welding a metal foil with a plate thickness of not more than 0.3 mm, such as is used in a metal foil type safety valve, the metal foil tends to be cracked or fractured by the pressure applied by the cold pressure welding to produce leakage.

The present inventors have conducted re-check, of a number of operating conditions in cold pressure welding, including tooth profile of the cold pressure welding metal molds, weld shape, surface treatment or heat treatment in meeting with material types of the metal foils or the vessel, pressing rate for cold pressure welding and holding time at the lower dead point, by a trial-and-error method, and succeeded in attaching a metal foil with a plate thickness up to 0.01 mm by the cold pressure molding method, so far thought not possible, and in applying the attaching technique to the metal foil type safety valve.

The present safety valve has been confirmed to have many advantages, such as higher air tightness and a lesser number of occurrences of troubles in hermetic sealing, shortened machining time, and suppression of the machining time to approximately one-fifth, as compared to the case of the conventional metal foil type safety valve by the light beam welding method, as well as facilitated realization of an optimum cleavage pressure and diminished fluctuations in the cleavage pressure in case of mass production, which are two of the crucial factors as safety valves.

In an embodiment the present invention provides an improved cleavage type safety valve for a metal vessel that comprises a piece of metal foil connected to the vessel and over an air vent hole in the vessel by cold pressure welding the foil to the vessel. The cold pressure welding of the outer periphery of the foil to the vessel results in an hermetic seal over the vent hole provided by the metal foil. Further, the cold pressure welding of the foil to the vessel creates a thin-walled portion of the foil disposed radially inwardly of the weld. The thin-walled portion provides a reliable cleavage point in the event the vessel becomes over pressurized.

In an embodiment where the metal vessel has a plate thickness of about 0.8 mm, the metal foil layer has a plate thickness prior to the cold pressure welding of about 0.03 mm. However, the plate thickness at the thin-walled portion of the foil layer (that is disposed radially inwardly from the outer periphery of the foil layer that is cold pressure welded to the vessel) has a plate thickness of substantially less than 0.03 mm.

In an embodiment, the ratio of the plate thickness of the metal foil to the plate thickness of the vessel is about 3:80.

In an embodiment, the ratio of the plate thickness of the metal foil to the diameter of the air vent hole disposed in the vessel is about 3:150.

In an embodiment, the vessel and metal foil are fabricated from A3003.

In an embodiment, the vessel has dimensions of 34 mm×6 mm×47 mm and a plate thickness of about 0.8 mm. The air vent hole has a diameter of about 1.5 mm and the plate thickness of the metal foil layer is about 0.03 mm. However, at the thin-walled portion inside of foil which is disposed inside of the outer periphery of the metal foil layer, which is cold pressure welded to the edge of the vessel which defines the air vent hole, the thickness of the metal foil layer is substantially less than 0.03 mm and can be as thin as 0.005 mm.

In an embodiment, the vessel further comprises a vessel body having an open end which is enclosed by a lid that is welded to the vessel body. The lid includes the air vent hole. The lid having dimensions of about 34 mm×6 mm. The lid also having a plate thickness of 0.8 mm and further being fabricated from A3003.

In an embodiment, the vessel can withstand an internal pressure of at least 15 kg/cm$^2$.

In an embodiment, the vessel can withstand an external pressure of at least 50 kg/cm$^2$.

In an embodiment, the present invention provides a method of forming a cleavage type safety valve in a vessel which comprises the steps of providing a vessel body having an open end, providing a lid for the vessel body, forming an air vent hole in the lid, cold pressure welding an outer periphery of a metal foil layer over the air vent hole to hermetically seal the air vent hole and to provide a thin-walled section of the foil inside of the outer periphery or the weld, and welding the lid to the vessel body.

Other objects and advantages of the present invention will become apparent from reading the following detailed description and appended claims, and upon reference to the accompanying drawings.

EXPLANATION OF NUMERALS

1, . . . lid; 2, . . . metal foil; 3, . . . cell can; 4, air vent hole; 5, thin-walled portion; 6, . . . upper punch; 7, . . . lower punch; 8, . . . electrode pull-out opening; 9, . . . weld; 10, . . . pressure-receiving portion of a marker type safety valve; 11, . . . dome; 12, . . . plate thickness of the thin-walled portion; 13, . . . cleft groove.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

The present invention will be explained with reference to a preferred embodiment thereof.

In the present embodiment, to an opening of a square tube shaped cell can 3, formed of an A3003 aluminum alloy, is welded a lid 1 formed of the same material to produce a metal vessel for a lithium ion secondary cell. To this metal vessel is mounted the present safety valve designed to be cleft at an internal pressure of 18 kg/cm$^2$.

Figure 1:
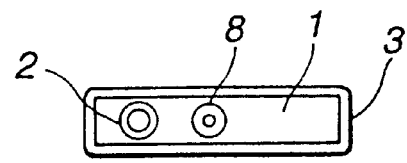
FIG. 1 is a plan view looking from a lid of a cell vessel.
Figure 2:
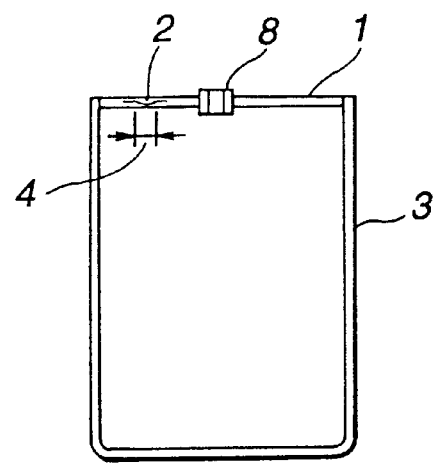
FIG. 2 is a cross-sectional view looking from the lateral side of the cell vessel.

The cell vessel shown in FIGS. 1 and 2 is made up of a cell can 3 of A3003, with a plate thickness of 0.8 mm and an outer size of 34 mm×6 mm×47 mm, and a lid 1 of A3003, with a plate thickness of 0.8 mm and an outer size equal to the inner size of an opening of 34 mm×6 mm of the cell can 3.

At a mid portion of the lid 1 is formed an electrode pull-out opening 8, and an air vent hole 4, which is 1.5 mm in diameter, is formed between the electrode pull-out opening 8 and the longitudinal end face of the can. The lid 1 and the cell can 3 are connected to each other by a welding method. Outside of this air vent hole 4, a metal foil 2 of A3003, with the plate thickness of 0.03 mm, is cold pressure welded and hermetically sealed.

Figure 3:
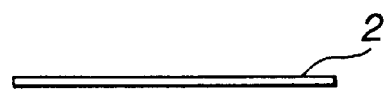
FIG. 3 is a side view of a metal foil prior to cold pressure welding.
Figure 4:
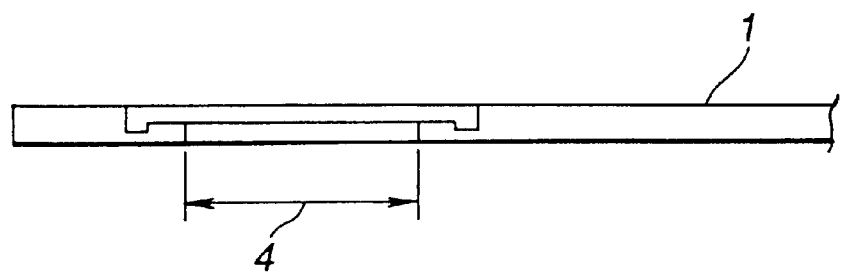
FIG. 4 is a cross-sectional view of a lid.
Figure 5:
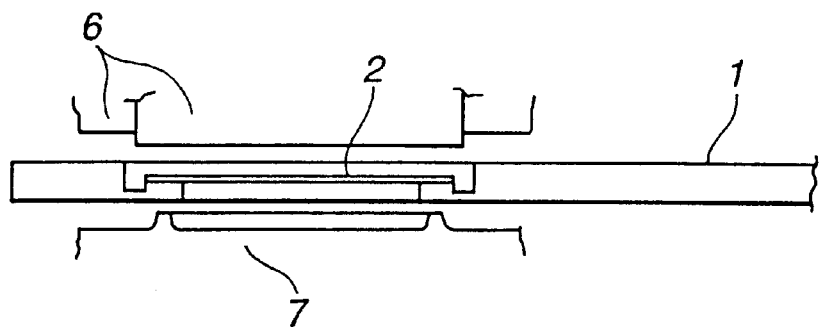
FIG. 5 is a cross-sectional view of a lid, a metal foil and a metal mold for cold pressure welding prior to cold pressure welding.

In FIGS. 1 to 11, the plate thicknesses of the lid 1, metal foil 2, weld 9, thin-walled portion and the cleft groove 13, and the diameter of the air vent hole 4 in FIG. 4, are exaggerated for illustration. Moreover, the contents of the cell, irrelevant to the illustration of the present invention, are omitted in FIG. 2.

FIG. 3 shows the metal foil 2.

This metal foil 2 is cold pressure welded for stopping the air vent hole 4, 1.5 mm in diameter, formed in the lid 1, to provide a safety valve.

Moreover, the lid 1 is inserted into the opening of the cell can 3 and welded by a light or laser beam welding method to complete a hermetically sealed vessel.

In the present embodiment, 100 vessel not charged with contents were fabricated for the purpose of testing air-tightness and cleavage pressure of the present safety valve and a hole for testing the cleavage was bored in the bottom of the cell can 3.

The test on air-tightness was conducted by applying an air pressure of 8.0 kg/cm$^2$ to the completed vessel for 15 seconds and by measuring changes in the pressure by an air leakage tester for judging the possible leakage. There were found no occurrences of air leakage.

The cleavage pressure test was conducted on samples already tested for air-tightness.

Turning to the testing method, hydrostatic pressure was applied at a pressurizing rate of 0.3 kg/cm$^2$/sec and the pressure on cleavage of the metal foil was measured.

The result was that the metal foil 2 was cleft beginning from the thin-walled portion 5 of the weld 9 formed at the time of cold pressure welding. The measured results of the cleavage pressure indicated that the pressure values ranged from 15 to 20 kg/cm$^2$, which is satisfactory with respect to the targeted value of 18 kg/cm$^2$.

This lid 1 was inserted into the opening of the cell can 3 and welded thereto by light beam welding to complete a hermitically sealed vessel.

The lid 1 and the metal foil 2, cold pressure welded together, were severed in a plane normal to the plane of the lid 1. While the weld 9 and thin-walled portion 5 were checked as to plate thickness over a microscope, the separation between the ends of the upper punch 6 and the lower punch 7 and other conditions were adjusted to search for the lower limit of the plate thickness of the thin-walled portion 5. It was found that lower range of the plate thickness is about 0.005 mm.

Since it is possible with the present safety valve to produce the thin-walled portion 5 to a plate thickness of not more than one-half that achieved with the conventional technique, an appropriate cleavage pressure ranging from 15 to 20 kg/cm$^2$ is realized even if the valve is reduced in size for mounting in a small-sized cell vessel as in the present embodiment.

Figure 6:
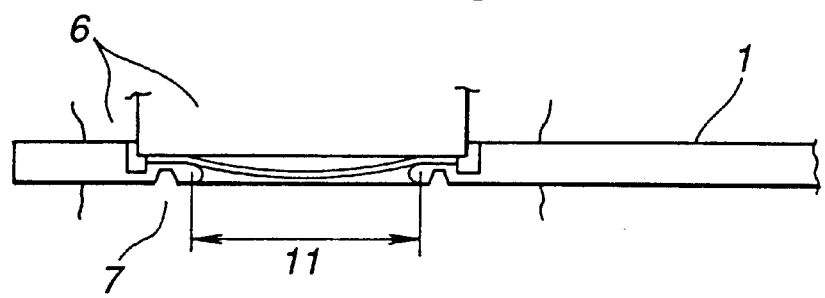
FIG. 6 is a cross-sectional view of a lid, a metal foil and a metal mold for cold pressure welding during cold pressure welding.
Figure 7:
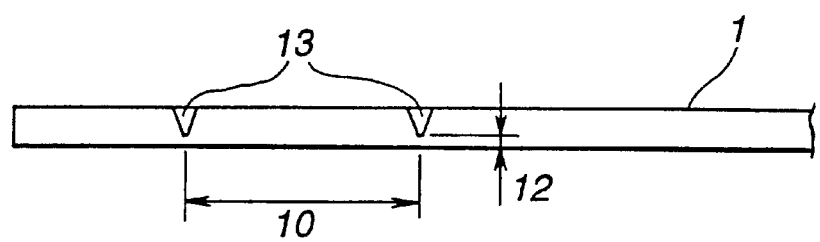
FIG. 7 is a cross-sectional view of a marker type safety valve.
Figure 8:
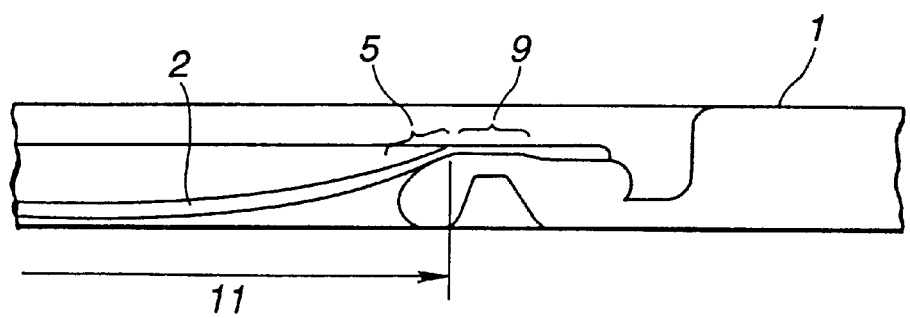
FIG. 8 is an enlarged cross-sectional view showing a thin-walled portion of a metal foil after cold pressure welding.

Referring to FIG. 6, the weld 9 of the metal foil 2 produced by the cold pressure welding was crushed under the pressure of the cold pressure welding mold, with the produced pads then becoming concentrated towards the center to produce a dome 11.

If the pads were not formed into a dome, there were produced wrinkles in the metal foil, thus producing the leakage at the folded portions or leading to an unstable cleavage pressure.

The dome 11 can be made convex on the inner side or on the outer side of the cell vessel by adjustment at the pressure welding mold. In the case of the sample convexed on the inner side of the cell vessel, the cleavage pressure on pressure application from the inner side of the vessel was found to be 15 to 20 kg/cm$^2$, while that on pressure application from the outer side of the vessel was found to be 50 to 60 kg/cm$^2$.

It was found that, if the dome 11 was convexed on the inner side of the vessel, the vessel was cleft at a moderate cleavage pressure against the pressure applied from inside of the vessel, while it exhibited pressure proofness on application of the pressure from outside which is more than double the pressure value applied from the inside. Thus, it was found that the inwardly convexed dome 11 gives more desirable properties if the present safety valve is used as a safety valve for the cell.

Figure 9:
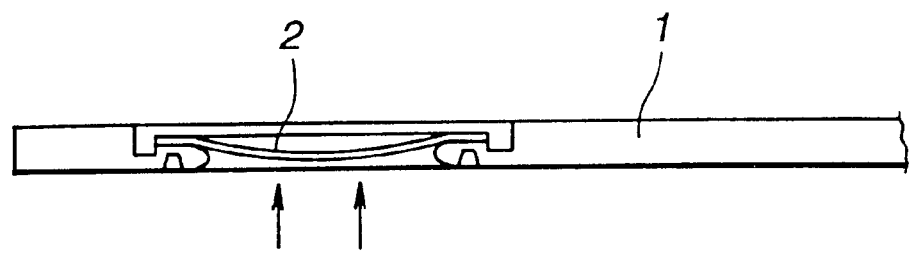
FIG. 9 is a cross-sectional view of a lid when the internal pressure in the vessel is below a prescribed value.
Figure 10:
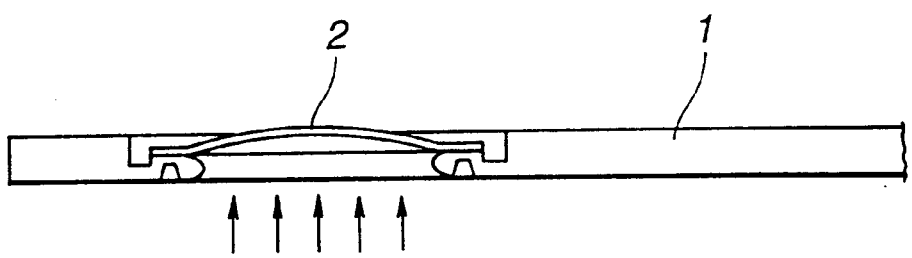
FIG. 10 illustrates the state in which the internal pressure in the vessel reaches a prescribed value and, the dome of the metal foil is reversed.
Figure 11:
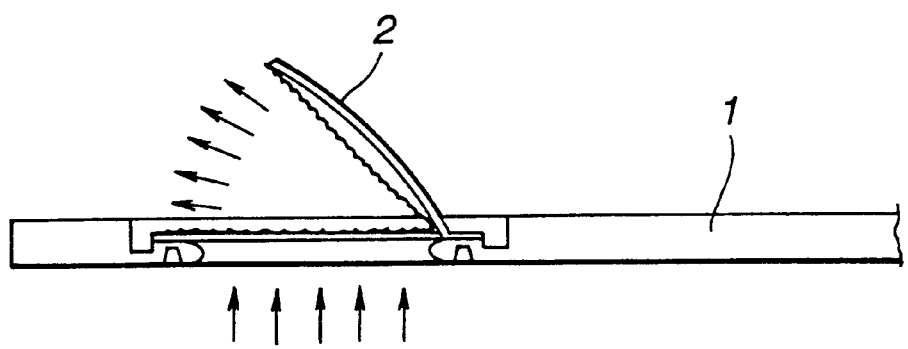
FIG. 11 illustrates the state in which the thin-walled portion has become cleft directly after reversion of the metal foil dome.

FIGS. 9 to 11 show the process up to cleavage of the dome 11.

In these figures, the lower side and the upper side with respect to the lid represent the inner and outer sides of the vessel, respectively.

FIG. 9 shows the normal state in which the internal pressure of the vessel is not up to the proscribed value, while FIGS. 10 and 11 illustrate the state of dome rehearsal when the internal pressure reaches the prescribed value and the state of cleavage of the thin-walled portion 5 directly after the dome reversal leading to opening of the internal pressure.

It was also found with the present safety valve that the portion of the inner surface of the weld 9 surrounding the thin-walled portion 5 performs the role equivalent to the pressure-receiving portion 10 of the marker type safety valve thus inducing cleavage of the thin-walled portion 5 to promote reliable cleavage at a moderate cleavage pressure.

INDUSTRIAL APPLICABILITY

Since the present safety valve has characteristics of easily realizing a moderately low cleavage pressure, even if the valve is reduced in size for mounting on a small-sized vessel, it is cleft with high precision when mounted as a safety valve in a metal vessel of, for example, a metal vessel, such as a high-performance secondary cell used in a portable equipment or the like, thus assuring safety of the user and preventing destruction of the equipment.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A cleavage safety valve for a metal vessel for a seal for an electrochemical cell, the vessel having a plate thickness and including an air vent hole having a diameter, the valve comprising:

a piece of metal foil comprising a central portion and an outer periphery that is connected to the vessel by cold welding, the metal foil further comprising a thin-walled portion disposed radially inward from and adjacent to the outer periphery, the thin-walled portion being created by the cold welding of the outer periphery of the metal foil to the vessel, the thin-walled portion being free of cracks and scores, the metal foil covering the air vent hole to provide a hermetic seal over the hole, the central portion of the metal foil having a plate thickness, the thin-walled portion of the metal foil having a plate thickness that is less than the plate thickness of the central portion, whereby an increased internal pressure inside the metal vessel above a predetermined value results in a cleavage of the metal foil at said thin-walled portion.

2. The valve of claim 1 wherein a ratio of the plate thickness of the central portion of metal foil to the plate thickness of the vessel being about 3:80; and a ratio of the plate thickness of the central portion of the metal foil to the diameter of the hole being about 3:150.

3. The valve of claim 1 wherein the vessel and the metal foil are fabricated from A3003.

4. The valve of claim 1 wherein the vessel has the dimensions 34 mm×6 mm×47 mm and the plate thickness of the vessel is about 0.8 mm and the plate thickness of the central portion of the metal foil is about 0.03 mm.

5. A cleavage safety valve for a metal vessel for a seal for an electrochemical cell, the vessel having a plate thickness of about 0.8 mm and including an air vent hole having a diameter of about 1.5 mm, the valve comprising:

a piece of metal foil comprising a central portion and an outer periphery, the outer periphery being connected to the vessel by cold welding, the metal foil further comprising a thin-walled portion disposed radially inward from and adjacent to the outer periphery, the thin-walled portion being created by the cold welding of the outer periphery of the metal foil to the vessel, the thin-walled portion being free of cracks and scores, the metal foil covering the air vent hole to provide a hermetic seal over the hole, the central portion of the metal foil having a plate thickness of less than or equal to 0.03 mm, the outer periphery of the metal foil having a plate thickness of less than the plate thickness of the central portion of the metal foil.

6. The valve of claim 5 wherein the vessel and foil are both fabricated from A3003.

7. The valve of claim 5 wherein the vessel has the dimensions 34 mm×6 mm×47 mm.

8. A cleavage safety valve for a lid of a metal vessel for a seal for an electrochemical cell, the lid having a plate thickness of about 0.8 mm and including an air vent hole having a diameter of about 1.5 mm, the valve comprising:

a piece of metal foil connected to the lid by cold pressure welding and covering the air vent hole to provide a hermetic seal over the hole, the metal foil having central portion with a plate thickness of less than or equal to 0.03 mm and an outer periphery that is cold welded to lid, the metal foil further comprising a thin-walled portion disposed radially inward from and adjacent to the outer periphery, the thin-walled portion being created by the cold welding of the outer periphery of the metal foil to the vessel, the thin-walled portion being free of cracks and scores, the thin-walled portion having a plate thickness of less than the plate thickness of the central portion of the metal foil.

9. The valve of claim 8 wherein the metal foil, lid and vessel are fabricated from A3003, the vessel has a plate thickness of about 0.8 mm, the lid is about 34 mm long and about6 mm wide, the vessel is about 34 mm long, about 6 mm wide and about 47 mm deep.

10. A cleavage safety valve for a lid of a metal vessel for a seal for an electrochemical cell, the lid and vessel both being fabricated from A3003 and both having a plate thickness of about 0.8 mm, the lid being about 34 mm long and about 6 mm wide, the vessel being about 34 mm long, about 6 mm wide and about 47 mm deep, the lid including an air vent hole having a diameter of about 1.5 mm, the valve comprising:

a piece of metal foil connected to the lid by cold welding and covering the air vent hole to provide a hermetic seal over the hole, the metal foil comprising A3003 and having a central portion with a plate thickness of less than or equal to 0.03 mm and an outer periphery that is connected to the lid, the outer periphery comprising a thin-walled portion having a plate thickness of less than the plate thickness of the central portion of the metal foil, the thin-walled portion being created by the cold welding of the outer periphery of the metal foil to the vessel, the thin-walled portion being free of cracks and scores.

11. An enclosed vessel for a seal for an electrochemical cell comprising:

a vessel body with an open end connected to a lid, the lid comprising an air vent hole, the air vent hole being hermetically sealed by a metal foil the forms a cleavage safety valve, the metal foil having a plate thickness, the metal foil comprising a central portion of an outer periphery, the metal foil further comprising a thin-walled portion disposed radially inward from and adjacent to the outer periphery, the outer periphery being connected to the lid by cold welding that reduces plate thickness of the metal foil at the outer periphery and at said thin-walled portion so that an increased internal pressure inside the metal vessel above a predetermined value results in a cleavage of the metal foil at said thin-walled portion, the thin-walled portion being free of cracks and scores.

12. The vessel of claim 11 wherein the lid, vessel body and metal foil are fabricated from A3003, the lid and vessel body both having a plate thickness of about 0.8 mm, the metal foil comprising A3003, the central portion of the metal foil having a plate thickness of less than or equal to 0.03 mm.

13. The vessel of claim 11 wherein the lid is about 34 mm long and about 6 mm wide, the vessel is about 34 mm long, about 6 mm wide and about 47 mm deep.

14. The vessel of claim 11 wherein the vessel can withstand an internal pressure of at least 15 $kg/cm^2$ prior to cleavage of the outer periphery of the metal foil.

15. The vessel of claim 11 wherein the vessel can withstand an external pressure of at least 50 $kg/cm^2$ prior to cleavage of the outer periphery of the metal foil.

16. A method of forming a cleavage safety valve in a vessel for a seal for an electrochemical cell, the method comprising the following steps:

providing a vessel body, providing a lid for the vessel body, forming an air vent hole in the lid, cold welding an outer periphery of a metal foil layer over the air vent hole to hermetically seal the air vent hole and creating a thin-walled portion disposed radially inwardly of and adjacent to the outer periphery, the thin-walled portion being free of cracks and scores, and welding the lid to the vessel body.

17. The method of claim 16 wherein the vessel, lid and foil all comprise A3003, the vessel and lid each having a plate thickness of about 0.8 mm, the foil layer having a uniform plate thickness prior to said cold pressure welding step of about 0.03 mm, the plate thickness of the outer periphery and the thin-walled section of the foil layer after the cold welding being substantially less than 0.03 mm.

18. The method of claim 16 wherein the lid is about 34 mm long and about 6 mm wide, the vessel is about 34 mm long, about 6 mm wide and about 47 mm deep.

19. The method of claim 16 wherein the plate thickness of the outer periphery of the foil layer after the cold welding step ranges from less than 0.03 mm to about 0.005 mm.

* * * * *

UNITED STATES PATENT AND TRADEMARK OFFICE
CERTIFICATE OF CORRECTION

PATENT NO.   : 6,589,687 B1
DATED        : July 8, 2003
INVENTOR(S)  : Keiichi Konno et al.

It is certified that error appears in the above-identified patent and that said Letters Patent is hereby corrected as shown below:

<u>Title page,</u>
Item [63], should read:
-- [63]  Continuation of application No. 09/068,414 filed on Oct. 19, 1998,
         issue as U. P. Patent No. 6,265,097 on July 24, 2001. --

Signed and Sealed this

Eleventh Day of November, 2003

JAMES E. ROGAN
*Director of the United States Patent and Trademark Office*